United States Patent
McNulty et al.

(10) Patent No.: US 7,732,526 B2
(45) Date of Patent: *Jun. 8, 2010

(54) SILICONE BINDERS FOR INVESTMENT CASTING

(75) Inventors: Thomas Francis McNulty, Ballston Lake, NY (US); John Thomas Leman, Niskayuna, NY (US)

(73) Assignee: General Electric Company, Niskayuma, NY (US)

( * ) Notice: Subject to any disclaimer, the term of this patent is extended or adjusted under 35 U.S.C. 154(b) by 148 days.

This patent is subject to a terminal disclaimer.

(21) Appl. No.: 11/865,926

(22) Filed: Oct. 2, 2007

(65) Prior Publication Data

US 2008/0027163 A1    Jan. 31, 2008

Related U.S. Application Data

(62) Division of application No. 10/675,374, filed on Sep. 30, 2003, now Pat. No. 7,287,573.

(51) Int. Cl.
  *C08L 83/04* (2006.01)
(52) U.S. Cl. ............. 524/588; 524/430; 524/433; 524/434; 524/437; 528/31; 528/32; 528/37
(58) Field of Classification Search ............ None
  See application file for complete search history.

(56) References Cited

U.S. PATENT DOCUMENTS

| | | | |
|---|---|---|---|
| 3,090,691 A | 5/1963 | Weyer | |
| 3,197,432 A | 7/1965 | Lamoreaux | |
| 3,197,433 A | 7/1965 | Lamoreaux | |
| 3,220,972 A | 11/1965 | Lamoreaux | |
| 3,313,773 A | 4/1967 | Lamoreaux | |
| 3,438,936 A | 4/1969 | Lamoreaux | |
| 3,516,946 A | 6/1970 | Modic | |
| 3,715,334 A | 2/1973 | Karstedt | |
| 3,775,452 A | 11/1973 | Karstedt | |
| 3,957,715 A | 5/1976 | Lirones et al. | |
| 4,086,311 A | 4/1978 | Huseby et al. | |
| 4,097,292 A | 6/1978 | Huseby et al. | |
| 4,108,672 A | 8/1978 | Klug et al. | |
| 4,108,676 A | 8/1978 | Huseby et al. | |
| 4,164,424 A | 8/1979 | Klug et al. | |
| 4,184,885 A | 1/1980 | Pasco et al. | |
| 4,190,450 A | 2/1980 | Robb et al. | |
| 4,247,333 A | 1/1981 | Ledder et al. | |
| 4,256,870 A | 3/1981 | Eckberg | |
| 4,269,753 A * | 5/1981 | Mine et al. | 524/588 |
| 4,288,345 A | 9/1981 | Ashby et al. | |
| 4,421,903 A | 12/1983 | Ashby | |
| 4,888,376 A * | 12/1989 | Atwell et al. | 524/401 |
| 4,894,194 A | 1/1990 | Janney | |
| 4,901,450 A | 2/1990 | Chemello et al. | |
| 4,998,581 A | 3/1991 | Lane et al. | |
| 5,028,362 A | 7/1991 | Janney et al. | |
| 5,162,480 A * | 11/1992 | Schilling et al. | 528/23 |
| 5,978,221 A * | 11/1999 | Sawa et al. | 361/704 |
| 6,037,397 A * | 3/2000 | Satoh et al. | 524/404 |
| 6,087,024 A | 7/2000 | Whinnery et al. | |
| 6,345,633 B1 | 2/2002 | Tartakovsky et al. | |
| 6,365,082 B1 | 4/2002 | Walls et al. | |
| 6,485,553 B1 | 11/2002 | Guinn | |
| 6,648,645 B1 | 11/2003 | MacDougald et al. | |
| 2003/0078334 A1 | 4/2003 | Doles et al. | |

OTHER PUBLICATIONS

Product information sheet for Dow Corning SE 1885 Kit.*

* cited by examiner

*Primary Examiner*—Marc S Zimmer
(74) *Attorney, Agent, or Firm*—Francis T. Coppa

(57) ABSTRACT

A green product for use in fabricating a ceramic article comprises a ceramic powder immobilized within a silicone matrix, wherein the silicone matrix comprises one or more cross linked or polymerized silicone monomers and/or oligomers, wherein the one or more cross linked or polymerized silicone monomers and/or oligomers have a alkenyl reactive functional group and a hydride reactive functional group. Processes for forming a green product and a ceramic core with the silicone monomers and/or oligomers are also disclosed.

13 Claims, No Drawings

SILICONE BINDERS FOR INVESTMENT CASTING

BACKGROUND

This disclosure generally relates to investment casting, and more particularly, relates to silicone-based binders for use in forming the ceramic cores and shell molds employed in investment casting.

The manufacture of gas turbine components, such as turbine blades and nozzles, requires that the parts be manufactured with accurate dimensions having tight tolerances. Investment casting is a technique commonly employed for manufacturing these parts. The dimensional control of the casting is closely related to the dimensional control of a ceramic insert, known as the core, as well as the mold, also known as the shell. In this respect, it is important to be able to manufacture the core and shell to dimensional precision corresponding to the dimensions of the desired metal casting, e.g., turbine blade, nozzle, and the like.

In addition to requiring dimensional precision in the casting of the ceramic core, the production of various turbine components requires that the core not only be dimensionally precise but also be sufficiently strong to maintain its shape during the firing, wax encapsulation, and metal casting processes. In addition, the core must be sufficiently compliant to prevent mechanical rupture (hot tearing) of the casting during cooling and solidification. Further, the core materials generally must be able to withstand temperatures commonly employed for casting of superalloys that are used to manufacture the turbine components, e.g., temperatures generally in excess of 1,000° C. Finally, the core must be easily removed following the metal-casting process. The investment casting industry typically uses silica or silica-based ceramics due to their superior leachability in the presence of strong bases.

Investment casting cores made using low pressure casting techniques generally suffer from poor mechanical properties. In low pressure casting techniques, ceramic slurry containing a solvent and one or more binders is poured into a mold. Typical binders are sodium silicate, hydrolyzed ethyl silicate, or silica sol as described in U.S. Pat. No. 2,928,749. The slurry then "gels" resulting in a rigid solid (sometimes referred to as a "polymer solvent gel matrix"). The gelled component and solvent are then removed by heating and/or a combination of heating and solvent extraction. Poor mechanical properties resulting from the low pressure casting process causes difficulty in ejecting cast parts from the metal die following curing. To impart mechanical strength to the core, the alcohol solvent commonly employed in the low pressure casting process is ignited, bisque firing the part in the casting die prior to ejection. This firing step can lead to thermally induced flaws in the core, reducing its strength and increasing production scrap that continues throughout the metal casting process.

For example, the prior art includes the use of silica (cristobalite) or silica-zircon as core materials. Dimensional control of the silica core is difficult for at least two reasons. First, crystalline-based silica materials are susceptible to Martensitic-type phase changes during the casting process. Accordingly, as a practical matter, the degree of crystallinity prior to casting is closely controlled. Otherwise, the core may crack once it is cooled down while still in the associated mold. Secondly, thermal expansion differences between the silica core and the associated mold are typically very large. Accordingly, it is difficult, if not impossible, to tightly fix the silica core within an associated mold without rendering the silica core susceptible to cracking.

Aluminum oxide, or "alumina", by itself, without a chemical or physical binder material, has also been identified as a potential core material, and is typically employed with reactive alloys. Unfortunately, cores comprised of alumina based ceramics are known to exhibit excessive thermal expansion and poor crush behavior. Such behavior is unacceptable for applications where dimensional precision is required during manufacture, such as in the production of directionally solidified metal eutectic alloys and superalloys, which are typically used for manufacturing of turbine components. Moreover, alumina cores are typically removed using an autoclave operation, which adds considerable expense to the process.

Further, shrinkage with a concomitant decrease in porosity results in a ceramic article with unsuitable mechanical properties for the casting of superalloys. In this regard, because there generally is a considerable thermal expansion mismatch between the ceramic and the alloy, hoop and longitudinal tensile stresses are experienced by the alloy upon cooling from the superalloy casting temperature. Accordingly, if the ceramic article is very dense (i.e., non-porous) with little plasticity and having a high resistance to deformation at elevated temperatures, this can lead to mechanical rupture or hot tearing of the alloy in the ceramic article.

Moreover, with regard to solvents, serious problems can sometimes occur. The various drying procedures available can result in shrinkage and warping of the article, as capillary forces draw the ceramic particles together. Green parts containing high levels of liquids often exhibit the most shrinkage. Moreover, parts that include both thin cross-sections and thicker cross-sections are very susceptible to cracking or distortion, as the thin sections dry faster than the thicker sections.

Investment casting molds, or shells, are similar to cores in that adherence to dimensional tolerances is required for quality castings. Unlike cores, investment casting shells are generally produced via layer-by-layer application over a pattern such that the shell cavity is defined by the shape of the pattern. Wax patterns are typically used due to the ease of fabrication and wax removal. The wax is removed by heating the shell to a temperature above its melting point and pouring out the wax. As a result, traditional manufacturing techniques such as slip casting or injection molding are difficult to implement in shell production.

As mentioned earlier, shells are generally produced using a layer-by-layer approach. In this approach, as described in U.S. Pat. No. 4,247,333, an alumina-based ceramic with a silica-based binder, similar to those listed for ceramic cores, is applied to the pattern surface, which is then coated with coarse alumina powder. A layer-by-layer process is employed to overcome the technical barriers associated with uniformly drying a bulk-ceramic article where the inner surface of the article is an impermeable wax interface. By applying relatively thin layers, drying uniformity is improved, and overall dimensional precision can be maintained. Consequently, the shell manufacturing step is a relatively lengthy process; and one in which mold thickness is largely defined by both composition and number of coatings.

As the designs of alloy castings become more complex, the performance of the mold becomes more critical. Consequently, techniques to strengthen the mold in critical locations have been employed, such as those outlined in U.S. Pat. No. 4,998,581. The need for strengthening arises from the fact that variable shell thickness is difficult to achieve using conventional layer-by-layer manufacturing techniques.

Accordingly, there remains a need in the art for improved ceramic slurries and more robust processes that provide cores and/or molds with the desired dimensional accuracy and mechanical properties with minimal shrinkage and warping.

BRIEF SUMMARY

Disclosed herein is a green product for use in fabricating a ceramic article, comprising a ceramic powder immobilized within a silicone matrix, wherein the silicone matrix comprises one or more cross linked or polymerized silicone monomers and/or oligomers, wherein the one or more cross linked or polymerized silicone monomers and/or oligomers, prior to cross linking and/or polymerization, contain an alkenyl reactive functional group and a hydride reactive functional group.

A process for forming a green product comprises mixing a ceramic powder with silicone monomers and/or oligomers to form a ceramic slurry, wherein the silicone monomers and/or oligomers contain an alkenyl functionality of formula:

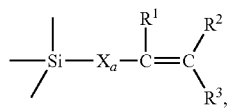

wherein $R^1$, $R^2$, and $R^3$ each independently comprise hydrogen or a monovalent hydrocarbon radical, X a divalent hydrocarbon radical and a is a whole number having a value between 0 and 8, inclusive, and a hydride functionality consisting of silicon-hydrogen bonds; and a hydride functionality consisting of silicon-hydrogen bonds; adding a metallic catalyst compound to the ceramic slurry; and cross linking and/or polymerizing the silicone monomers and/or oligomers to form a rigid silicon matrix.

A process for forming a ceramic core comprises mixing a ceramic powder with silicone monomers and/or oligomers to form a ceramic slurry, wherein the silicone monomers and/or oligomers comprise an alkenyl functionality of formula:

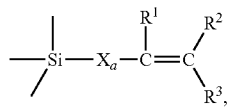

wherein $R^1$, $R^2$, and $R^3$ each independently comprise hydrogen or a monovalent hydrocarbon radical, X is a divalent hydrocarbon radical, and a is a whole number having a value between 0 and 8, inclusive, and a hydride functionality consisting of silicon-hydrogen bonds; adding a metallic catalyst to the ceramic slurry; transferring the ceramic slurry into a mold; cross linking and/or polymerizing the silicone monomers and/or oligomers to form a green product; and heating the green product to a temperature effective to decompose the crosslinked and/or polymerized silicone monomers and/or oligomers and form a silica char in the ceramic core.

The above described and other features are exemplified by the following detailed description.

DETAILED DESCRIPTION

Disclosed herein are green product compositions and processes suitable for fabricating cores for use in investment casting. The process generally includes dispersing a ceramic powder in a silicone fluid, wherein the silicone fluid includes silicone monomers and/or oligomers having alkenyl and hydride functionalities. In a preferred embodiment, the silicone monomers and/or oligomers have at least three alkenyl functionalities and at least three hydride functionalities per monomer or oligomer repeat unit. Once a stable suspension is formed, a metallic catalyst is added and the desired part is cast. Depending on the particular monomers/oligomers and metallic catalyst employed, a heating step may then be applied to cure the cast suspension into a green body. The silicone monomers and/or oligomers cross link in the mold yielding a rigid core of ceramic particles in a silicone based polymeric matrix. The so-formed silicone polymeric matrix may be substantially decomposed in the core or shell to produce a silica char by further heating at a higher temperature. Advantageously, the compositions and process can be used to provide a reduction in the amount of ceramic powder used in the mold, while yielding a core or shell that exhibits minimal volume shrinkage.

In one embodiment, the silicone monomers and/or oligomers represent the dispersant medium for the ceramic powder, i.e., solvent is not required. As a result, the emission of volatile organic compounds (VOCs) is essentially eliminated. Moreover, since a solvent is not used, special liquid-permeable molds designed for solvent removal are not needed. Rather, conventional steel molds can be employed representing a significant commercial and economic advantage. Still further, the absence of solvent eliminates a drying step that is typically employed in the prior art for removing the solvent, which, as previously discussed, can lead to thermally induced flaws. As a result, cycle time is reduced since the drying time is essentially eliminated relative to solvent-based systems, thereby providing additional commercial and economic benefits.

In an alternative embodiment, the silicone monomers and/or oligomers having the alkenyl and hydride functionalities are first dissolved in a volatile solvent, (e.g., aliphatic and aromatic hydrocarbons that can be removed by heat treatment), which are then added to the ceramic powder to form a ceramic slurry and further processed as generally described above. Advantageously, once the solvent is removed, decomposition of the cross-linked silicone binder is relatively easier compared to a solvent-free process due to the interconnected porosity present in the core as a result of the solvent removal.

Ceramic powders suitable for use in the present disclosure include, but are not intended to be limited to, alumina, fused alumina, fused silica, magnesia, zirconia, spinels, mullite, glass frits, tungsten carbide, silicon carbide, boron nitride, silicon nitride, and mixtures thereof. Most often, the ceramic powder comprises silica, mixtures of silica and zircon, or mixtures of silica and alumina.

Other additives that may be present in the ceramic powder include, but are not intended to be limited to, aluminum, yttrium, hafnium, yttrium aluminate, rare earth aluminates, colloidal silica, magnesium, and/or zirconium for increasing refractory properties of the shell mold or core composition. In addition, deflocculants may be added such as stearic acid.

The silicone monomers and/or oligomers having the alkenyl functionalities that may be added as a binder to the ceramic slurry are alkenyl siloxanes of the general formula (I):

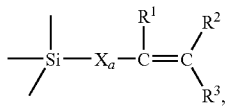 (I)

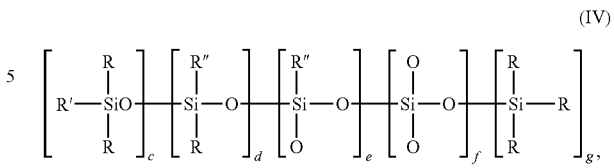 (IV)

wherein $R^1$, $R^2$, and $R^3$ each independently comprise hydrogen or a monovalent hydrocarbon radical, X a divalent hydrocarbon radical and a is a whole number having a value between 0 and 8, inclusive. The terms "monovalent hydrocarbon radical" and "divalent hydrocarbon radical" as used herein are intended to designate straight chain alkyl, branched alkyl, aralkyl, cycloalkyl, and bicycloalkyl radicals.

The silicone hydride monomers and/or oligomers are hydrosiloxanes having hydrogen directly bonded to one or more of the silicon atoms, and therefore contain a reactive Si—H functional group.

Cross-linking of the silicone monomers and/or oligomers may be accomplished by utilizing a metal catalyzed reaction of the silicone alkenyl groups and the silicon bonded hydrogen groups. The metal catalyst, preferably a platinum group metal catalyst, can be selected from such catalysts that are conventional and well known in the art. Suitable metallic catalysts include, but are not intended to be limited to, the Pt divinylsiloxane complexes as described by Karstedt in U.S. Pat. No. 3,715,334 and U.S. Pat. No. 3,775,452; Pt-octyl alcohol reaction products as taught by Lamoreaux in U.S. Pat. No. 3,220,972; the Pt-vinylcyclosiloxane compounds taught by Modic in U.S. Pat. No. 3,516,946; and Ashby's Pt-olefin complexes found in U.S. Pat. Nos. 4,288,345 and 4,421,903.

Exemplary alkenyl siloxanes useful in the present disclosure include polyfunctional olefinic substituted siloxanes of the following types:

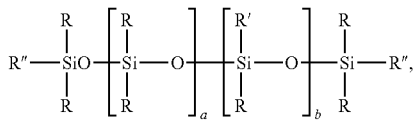 (II)

wherein R is a monovalent hydrocarbon, R' is an alkenyl radical such as vinyl, or other terminal olefinic group such as allyl, 1-butenyl, and the like. R" may include R or R', a=0 to 20, inclusive, and b=1 to 80, inclusive, wherein a and b are selected to provide a fluid with maximum viscosity of 1,000 centistokes, and such that the ratio of b/a allows for at least three reactive olefinic moieties per mole of siloxane of formula (II) above.

Suitable alkyl/alkenyl cyclosiloxanes are of formula (III):

[RR'SiO]$_x$, (III)

wherein R and R' are as previously defined, and x is an integer 3 to 18 inclusive.

Other suitable functional unsaturated siloxanes may be of the formula (IV):

wherein R, R', and R" are as previously defined. Preferably, the ratio of the sum of (c+d+e+g)/f is $\geq 2$.

Exemplary unsaturated siloxanes include 1,3-divinyl-tetramethyldisiloxane, hexavinyldisiloxane, 1,3-divinyltetraphenyldisiloxane, 1,1,3-trivinyltrimethyldisiloxane, 1,3-tetravinyldimethyldisiloxane, and the like. Exemplary cyclic alkyl- or arylvinylsiloxanes include 1,3,5-trivinyl-1,3,5-trimethylcyclotrisiloxane, 1,3,5,7-tetravinyl-1,3,5,7-tetramethylcyclotetrasiloxane, 1,3-divinyloctaphenylcyclopentasiloxane, and the like.

Suitable polyfunctional hydride siloxanes include compositions depicted below:

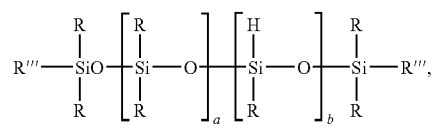 (V)

wherein R is as defined previously, R''' may include R or H, and a and b are defined as above, and selected such that the ratio of b/a allows for at least three reactive Si—H moieties per mole of siloxane of formula (V) above.

Suitable alkyl/hydride cyclosiloxanes of formula:

[HRSiO]$_x$, (VI)

wherein R is as previously defined, and x is an integer 3 to 18 inclusive.

Other suitable functional hydride siloxanes include:

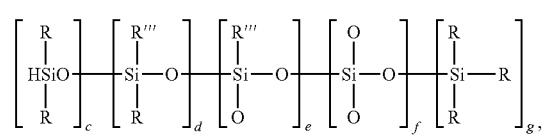 (VII)

wherein R and R''' are as previously defined. Preferably, the ratio of the sum of (c+d+e+g)/f is $\geq 2$.

Exemplary silicone hydrides include poly(methylhydrogen)siloxane, poly[(methylhydrogen)-co-(dimethyl)]siloxane; 1,3,5,7-tetramethylcyclotetrasiloxane, 1,3,5,7,9-decamethylcyclopentasiloxane, and other cyclic methylhydrogen siloxanes; tetrakis(dimethylsiloxy)silane, and organically modified resinous hydride functional silicates corresponding to Formula (VII), with the composition [HSi(CH$_3$)$_2$O$_{1/2}$]$_2$ (SiO$_2$).

The matrix for the "gel" is selected so as to include at least one alkenyl and hydride siloxane as described above.

Additional terminally functional alkenyl or hydride siloxanes described below in formulas (VIII) and (IX), alone or in combination, may be added to augment the matrix composition in order to lower the viscosity of the uncrosslinked matrix, effect changes in the cured green body hardness and strength, and so on, as would be apparent to those skilled in the art in view of the present disclosure.

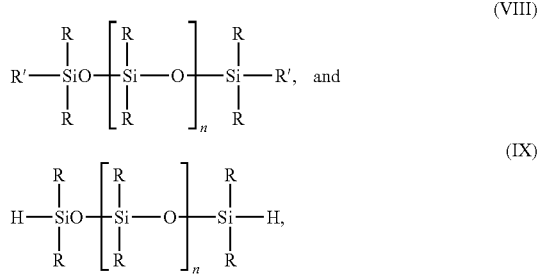

wherein R and R' are as previously defined; and n=0 to 100, preferably 0 to 30, and most preferably 0 to 10.

It should also be apparent that a satisfactory crosslinked network may be effected in the course of this disclosure, by combining one component from each of A) a polyfunctional alkenyl or polyfunctional hydride siloxane, as defined in Formulas (II)-(IV) or Formulas (V)-(VII), respectively; and B) a terminally functional alkenyl or hydride siloxane as defined in Formulas (VIII) or (IX) respectively, restricted only such that the composition contains both an alkenyl and a hydride functional species to allow crosslinking between the complementary alkenyl and hydride reactive functional groups.

The preparation of cores for shell molds and the like generally includes forming a green product from a ceramic slurry comprising the silicone monomers and/or oligomers, and a ceramic powder using a low pressure forming method, such as gel casting, and then firing the green product up to a temperature of about 900° C. to about 1,650° C. under an oxygen-containing atmosphere. This process facilitates the fabrication of a core with dimensional precision to suit the desired dimensions of the superalloy to be cast from such core. Further, cores created from this process are dimensionally stable and of a desired strength to permit their deformation during the cooling and solidification of the casting.

In a preferred embodiment, the ceramic powder is first mixed with one or more silicone monomers and/or oligomers to form a slurry mixture, wherein the one or more silicone monomers and/or oligomers comprise the alkenyl and hydride reactive functionalities as previously described. The silicone fluid is preferably a liquid at room temperature, and as such, can be used to provide a low viscosity vehicle for the ceramic powder. Advantageously, the solvent free ceramic slurry permits the use of conventional molds. That is, molds that are not necessarily liquid-permeable as is generally required for solvent containing green products. Upon addition of the metallic catalyst, the liquid monomers and/or oligomers can be made to polymerize and/or crosslink to form a firm, strong polymer/solvent (if present) gel matrix. The gel matrix immobilizes the ceramic powder into the desired shape of the mold in which the slurry mixture is gelled. The resultant "green" product exhibits exceptionally high strength and toughness (i.e., is not brittle, resists tearing, cracking, etc.). The alkenyl and hydride functional group concentration in the silicone monomers and/or oligomers can provide a high cross linking density, which results in a high silica yield upon burnout of the molded core. The resultant high silica yield from the matrix allows for the possibility of reduced ceramic powder loadings in the slurry for ease of handling and mold filling while simultaneously yielding a part with minimal shrinkage after firing.

The viscosity of the curable silicone matrix, theoretical cross-link density, and resultant silica char yield may be adjusted using the appropriate silicone hydride and alkenyl compounds, and the stoichiometric ratio of total hydride to alkenyl reactive functional groups. For instance, the viscosity of the uncured silicone matrix can vary from about 1 to about 1,000 centistokes, preferably about 1 to about 300 centistokes, and most preferably about 1 to about 100 centistokes. The theoretical crosslink density, as defined by the average molecular mass of the shortest formula repeat unit distance between reactive hydride or alkenyl functional crosslink sites, can vary from about 30 to about 4,100 g/mole, preferably from about 30 to about 500 g/mole, and most preferably from about 0 to about 150 g/mole. To produce a suitably hard and resilient silicone matrix, the hydride to alkenyl ratio is conveniently taken in the range of 0.5 to 3, preferably in the ratio of 0.5 to 2, and most preferably in the range of 1.0 to 1.75. In the particular case of 1,3,5,7-tetramethylcyclotetrasiloxane and 1,3,5,7-tetravinyl-1,3,5,7-tetramethylcyclotetrasiloxane, combinations in molar ratios from 0.5 to 2, gave silica yields upon pyrolysis of the cured matrix at 1,000° C. in air equal to 74 to 87% of the original mass.

In another embodiment, the one or more monomers and/or oligomers is first dissolved in a solvent prior to mixing with the ceramic powder. Thus, the one or more monomers and/or oligomers solution may be a liquid or solid depending on the physical properties of the monomer. The solvent which may be included in the monomer and/or oligomer solution may comprise any organic solvent which is a solvent for the monomers and/or oligomers, and preferably exhibits a low vapor pressure at the temperature at which the one or more monomers and/or oligomers polymerizes and crosslinks, and exhibits a relatively low viscosity. Preferred solvents include, but are not limited to, aliphatic and aromatic hydrocarbons and other high-boiling point petroleum solvents.

Optionally, the ceramic powder may first be dispersed with a dispersant for the powder and then mixed with the silicone monomers or oligomers in the manner previously described, with or without solvent. Various dispersants for ceramic powders are known in the art and are appropriate for use in the present disclosure. Care should be exercised however in order to select a dispersant which does not interact with the monomers, solvent (if present), or metallic catalyst. A particular dispersant may be evaluated for suitability with a particular ceramic powder and a particular monomer, solvent and catalyst by mixing small amounts of the respective components and judging the flow properties of the resultant mixture, whether the resultant mixture exhibits a notable yield point, and/or whether the mixture exhibits pseudoplastic behavior. Typical dispersants include stearic acid, oleic acid, and menhaden fish oil. Generally, the dispersant is used in a small amount, by volume, as compared with the amount, by volume, of the ceramic powder included in the mixture.

Generally, the amount of silicone monomer and/or oligomer included in the ceramic slurry determines the degree of hardness of the resulting solid, shaped product. Generally, an exceptionally hard green product can be formed using about 50 to about 75 volume percent of silicone monomers and/or oligomers having a alkenyl to hydride functional group ratio of about a 1:1 in the green product, and in a preferred embodiment, the one or more silicone monomers and/or oligomers comprise about 55 to about 65 volume percent, wherein the volume percent is based on the total volume of the green product.

Once the slurry is prepared, the catalyst is added just prior to the casting process. Optionally, inhibitors may be added along with the catalyst to prevent premature gelling before a part is cast. Such inhibitors are well known in the art, a preferred example of which is provided in U.S. Pat. No. 4,256,870. Preferably, the slurry mixture with the catalyst or catalyst/inhibitor is at about room temperature. However, once the slurry mixture is heated, the reaction rate is relatively high whereby polymerization and cross linking of the silicone monomers and/or oligomers is easily and quickly achieved. The amount of metallic catalyst included in the slurry mixture is generally small as compared with the amount of monomers and/or oligomers in accordance with conventional curing and cross-linking methods.

The slurry is then transferred, e.g., by extrusion, pouring, syringe transfer, pressing, gravity transfer, and the like, into a closed cavity of the mold. Preferably, where extrusion is used, the ceramic slurry is extruded under low pressure (less than 50 psi) into a die and then gelled. The gelling process is preferably accomplished with heat for rapid manufacturing. However, room temperature gelation is preferred where a metal component (if present) reactivity is excessive, e.g. aluminum, wherein the metal component is disposed to react with available organic matter to produce undesirable hydrogen gas bubbles. Other molding techniques, including injection molding, may also be employed. Moreover, any conventional additives known in the ceramic processing arts, for example, mold release agents, may be included in the slurry mixtures for their known functions.

The exact temperature at which polymerization and/or crosslinking occurs depends on the particular metallic catalyst compound and the particular monomers and/or oligomers that are included. Preferably, the temperature should be greater than about room temperature, more preferably at about room temperature to about 120° C., and even more preferably about 50° C. to about 100° C. Similarly, the time necessary to form a firm polymer-solvent gel matrix is dependent on the particular monomer, solvent, and metallic catalyst compound. Generally, the mold containing the slurry mixture is preferably heated at an elevated temperature (i.e., greater than room temperature) for at least about five minutes, and more preferably, is heated for a period of about 5 to about 30 minutes in order to polymerize and crosslink the monomer and form the firm polymer-solvent (if present) gel matrix. After polymerization and crosslinking has occurred, the resultant, solid green body may be cooled to ambient temperature and removed from the mold. If a solvent as described earlier is utilized, the product is in a wet, green condition in that it may contain solvent and/or is in the unsintered form. Green products thus formed have exhibited extreme strength and toughness.

The wet, green product may subsequently be heated in order to substantially remove the solvent and provide a dry product. Removal of the solvent, if present, creates interstitial spaces within the ceramic, resulting in an open-pore intermediary product. Such structure speeds decomposition of the silicone compounds during sintering by promoting more rapid oxidation, as well as more complete oxidation of the metallic component, e.g., aluminum, if present within green product. This is because mass transport of oxygen gas is facilitated by the open pore structure. Although the specific temperature and time necessary for drying the product depends on the specific metal-containing powder and monomer solution employed, drying may generally be effected by heating at a temperature that does not exceed the boiling point of the solvent, if applicable. As such, the temperature is preferably at about room temperature to about 100° C., with about room temperature to about 50° C. even more preferred, in an oven for a period greater than about two hours, preferably for a period of from about 2 to about 6 hours. In a preferred embodiment, carried out in the absence of a solvent and without need for a solvent-drying step, the well-known thermal decomposition of the silicone matrix generates low molecular weight cyclic siloxane species, which are driven off and also produces a desirable open-pore intermediary product. Additionally, the silicone polymer formed may be substantially decomposed to produce a silica char by further heating at a higher temperature, for example, greater than about 500° C. Finally, the solid, shaped product may be sintered to form a body of adequate density for use in investment casting. Sintering temperatures for various ceramic powders are well known in the art. Alternatively, substantial decomposition of the silicone polymer may be accomplished as a low temperature step of the sintering process.

In a preferred embodiment, the green product is generally allowed to set in the die for 1 to 2 hours at about room temperature or for about 15 minutes at about 50° C.

Once dried, the green product is heated in a conventional kiln under an oxygen-containing atmosphere to a temperature of about 900° C. to about 1,650° C. for an aggregate period of about 2 to about 48 hours. The heating rate is preferably at about 50 to about 200° C./hour.

The following examples are provided to illustrate some embodiments of the present disclosure. They are not intended to limit the disclosure in any aspect.

Example 1

In this example, a 38% by volume ceramic article was cast using a mixture of 1,3,5,7-tetravinyl-1,3,5,7-tetramethylcyclotetrasiloxane and a poly[(methylhydrogen)-co-(dimethyl)]siloxane. In this case, the vinyl to silicone hydride molar ratio was maintained at 1:1. The ceramic was a mixture of amorphous silica and zircon. A 422 gram batch was prepared by mixing the various constituents for 15 seconds in a high-shear mixer operating at 2,500 rpm. Following mixing, the batch was degassed using a rotary vacuum mixer for 5 minutes operating at roughly 50 torr and 60 rpm.

The batch was then cast into a mock investment casting core by infiltrating a specially-designed steel die with the slurry at roughly 10 psi pressure. Following casting, the part was cured at 100° C. for roughly 30 minutes prior to part ejection. Following ejection, the part was cooled to room temperature.

Following casting, the part was fired in air at a rate of 10° C. per hour to a temperature of about 600° C., with about a 5 hour soak at 600° C. The part was then heated to a temperature of about 1,100° C. at a rate of 300° C. per hour, with about a 2 hour soak at 1,100° C. Following the soak, the part was cooled to room temperature.

Example 2

Ceramic test bars were cast using a mixture of 1,3,5,7-tetravinyl-1,3,5,7-tetramethylcyclotetrasiloxane and 1,3,5,7-tetramethylcyclotetrasiloxane in a molar ratio of 1:1. The ceramic was a mixture of amorphous silica and zircon, present at 40% by volume. A 177.8 gram batch was prepared by mixing the constituents for 10 seconds in a high-shear mixer at 2,500 rpm. Following mixing, the batch was degassed in a rotary vacuum mixer for 5 minutes at roughly 50 torr and 60 rpm.

The batch was then loaded into disposable transfer syringes, and hand injected into a custom designed steel casting die. Approximate die opening dimensions were 0.1"× 0.5"×5". Following casting, the articles were cured at 50° C. for roughly 90 minutes prior to removal. The resultant article had a smooth hard surface, was strong and resilient, and could be readily handled without breaking.

Example 3

Ceramic test bars were cast using a mixture of 1,3,5,7-tetravinyl-1,3,5,7-tetramethylcyclotetrasiloxane and a hydride functional silicate resin corresponding to Formula (VII), containing hydridodimethylsiloxy and silicate units in a molar ratio of 2:1. The total silicon hydride to vinyl molar ratio was 1:1. The ceramic was a mixture of amorphous silica and zircon, present at 40% by volume. A 177.8 gram batch was prepared by mixing the constituents for 10 seconds in a high-shear mixer at 2,500 rpm. Following mixing, the batch was degassed in a rotary vacuum mixer for 5 minutes at roughly 50 torr and 60 rpm.

The batch was then loaded into disposable transfer syringes, and hand injected into a custom designed steel casting die. Approximate die opening dimensions were 0.1"× 0.5"×5". Following casting, the articles were cured at 50° C. for roughly 90 minutes prior to removal. The resultant article had a smooth hard surface, was strong and resilient, and could be readily handled without breaking.

The present disclosure provides a number of important advantages by providing a low pressure method for fabricating a fired ceramic article for use as a shell mold or core in the investment casting of directionally solidified eutectic and superalloy materials, which is dimensionally stable and of a desired strength such that it is capable of deformation during cooling and solidification of the casting. In this respect, the fired ceramic article is sufficiently porous for facilitating such deformation. The low shrinkage of the fired ceramic article is attributable, at least in part, to the use of highly crosslinked silicone monomers and/or oligomers having alkenyl and hydride functional groups. Moreover, the use of an in-situ gelation process that is free from solvent removes the necessity of igniting the part after casting. Because of the elimination of the firing step, surface flaws are reduced and an increase in yield rate throughout the investment casting process can advantageously be expected. Finally, since a single-step casting technique is employed, variable shell thickness independent of the wax pattern is possible.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A green product for use in fabricating a ceramic core, comprising a ceramic powder immobilized within a silicone matrix, wherein the silicone matrix comprises one or more cross linked or polymerized silicone monomers and/or oligomers wherein the one or more cross linked or polymerized silicone monomers and/or oligomers, prior to cross linking and/or polymerization, contain at least three alkenyl reactive functional groups or at least three hydride reactive functional groups per mole of monomer or oligomer; and have a viscosity of about 1 to about 1,000 centistokes; wherein the green product has the shape of the desired ceramic core, and wherein the outer surface of the ceramic core defines the shape of at least one internal cavity of a turbine component.

2. The green product according to claim 1, wherein the hydride reactive functional groups and the alkenyl reactive functional groups are present at a molar ratio of about 0.5 to 3.

3. The green product of claim 1, wherein the one or more cross linked or polymerized silicone monomers and/or oligomers, prior to cross linking and/or polymerization, are free of solvent.

4. The green product according to claim 1, wherein the ceramic powder comprises at least one material selected from the group consisting of alumina, fused alumina, fused silica, magnesia, zirconia, spinels, mullite, glass fits, tungsten carbide, silicon carbide, boron nitride, silicon nitride, and combinations comprising at least one of the foregoing ceramics.

5. The green product according to claim 4, wherein the ceramic powder further comprises an additive comprising at least one material selected from the group consisting of aluminum, yttrium, hafnium, yttrium aluminate, rare earth aluminates, colloidal silica, magnesium, zirconium, or combinations comprising at least one of the foregoing.

6. The green product according to claim 1, wherein the one or more silicone monomers and/or oligomers having the hydride functional group is selected from the group consisting of:

a polyfunctional hydride siloxane of formula:

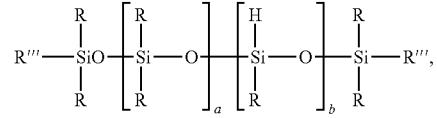

wherein R is a monovalent hydrocarbon, R''' is a monovalent hydrocarbon or hydrogen, a=0 to 20, inclusive, and b=1 to 80, inclusive, wherein a and b are selected to provide a fluid with a maximum viscosity of 1,000 centistokes, an alkyl/hydride cyclosiloxane of formula:

wherein x is an integer 3 to 18 inclusive, a functional hydride siloxane of formula:

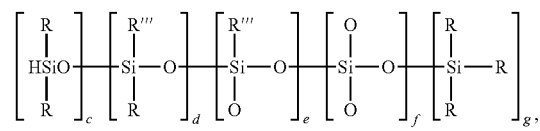

wherein a ratio of the sum of (c+d+e+g)/f is 2, a terminal hydride siloxane of formula:

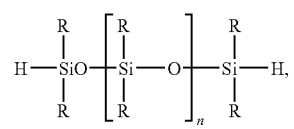

wherein n=0 to 100, and mixtures thereof.

7. The green product according to claim 1, wherein the one or more silicone monomers and/or oligomers containing the alkenyl functional group comprises a formula of:

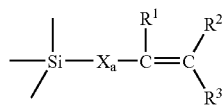

wherein $R^1$, $R^2$, and $R^3$ each independently comprise hydrogen or a monovalent hydrocarbon radical, X a divalent hydrocarbon radical, and a is 0 or 1.

8. The green product according to claim 1, wherein the one or more silicone monomers and/or oligomers having the alkenyl functional group is selected from the group consisting of:

polyfunctional siloxanes of formula:

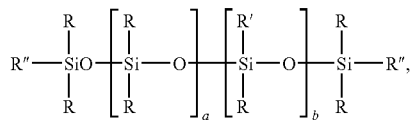

wherein R is a monovalent hydrocarbon, R' is an alkenyl radical, R" is a monovalent hydrocarbon or an alkenyl radical, a=0 to 20, inclusive, and b=1 to 80, inclusive, wherein a and b are selected to provide a fluid with a maximum viscosity of 1,000 centistokes, a cyclic alkyl/alkenyl siloxane of formula:

$[RR'SiO]_x$, wherein R and R' are as previously defined; wherein x is an integer 3 to 18 inclusive;

an unsaturated siloxane of formula:

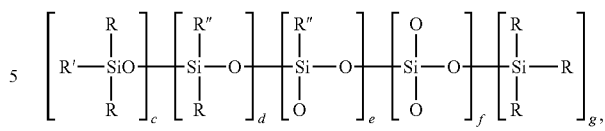

wherein R, R', and R" are as previously defined;
and mixtures thereof.

9. The green product according to claim 1, wherein the silicone matrix has a crosslinik density, as defined by the average molecular mass of the shortest formula repeat unit distance between a reactive hydride or an alkenyl functional crosslinik site, of about 30 to about 4,100 grams per mole.

10. The green product according to claim 1, wherein the one or more silicone monomers and/or oligomers having the hydride functional group is selected from the group consisting of poly(methylhydrogen)siloxane, poly[(methylhydrogen)-co-(dimethyl)]siloxane; 1,3,5,7-tetramethylcyclotetrasiloxane, 1,3,5,7,9-decamethylcyclopentasiloxane, cyclic methylhydrogen siloxanes; tetrakis(dimethylsiloxy)silane, hydridodimethylsiloxy silicate $[HSi(CH_3)_2O_{1/2}]_2 (SiO_2)$, and mixtures thereof.

11. The green product according to claim 1, wherein the one or more silicone monomers and/or oligomers having the alkenyl functional group is selected from the group consisting of 1,3-divinyl-tetramethyldisiloxane, hexavinyldisiloxane, 1,3-divinyltetraphenyldisiloxane, 1,1,3-trivinyltrimethyldisiloxane, 1,3-tetravinyldimethyldisiloxane, 1,3,5-trivinyl-1,3,5-tri-methylcyclotrisiloxane, 1,3,5,7-tetravinyl-1,3,5,7-tetramethylcyclotetrasiloxane, 1,3-divinyloctaphenylcyclopentasiloxane, and mixtures thereof.

12. The green product according to claim 1, further comprising at least one solvent.

13. An investment casting core fabricated with the green product of claim 1.

* * * * *

UNITED STATES PATENT AND TRADEMARK OFFICE
CERTIFICATE OF CORRECTION

| | | |
|---|---|---|
| PATENT NO. | : 7,732,526 B2 | |
| APPLICATION NO. | : 11/865926 | |
| DATED | : June 8, 2010 | |
| INVENTOR(S) | : McNulty et al. | |

It is certified that error appears in the above-identified patent and that said Letters Patent is hereby corrected as shown below:

Title Page, Item (73), under "Assignee", delete "Niskayuma," and insert -- Niskayuna, --, therefor.

In Column 12, Line 16, in Claim 4, delete "fits," and insert -- frits, --, therefor.

In Column 12, Line 56, in Claim 6, delete "2," and insert -- $\geq 2$, --, therefor.

In Column 14, Line 12, in Claim 9, delete "crosslinik" and insert -- crosslink --, therefor.

In Column 14, Line 15, in Claim 9, delete "crosslinik" and insert -- crosslink --, therefor.

Signed and Sealed this
Twenty-eighth Day of June, 2011

David J. Kappos
*Director of the United States Patent and Trademark Office*